US011099266B2

(12) United States Patent
Zhai et al.

(10) Patent No.: US 11,099,266 B2
(45) Date of Patent: Aug. 24, 2021

(54) TRAJECTORY BASED THREAT ALERTING WITH FRIENDLY DEVICE AUGMENTATION

(71) Applicant: International Business Machines Corporation, Armonk, NY (US)

(72) Inventors: Yun Zhai, Pound Ridge, NY (US); Peter Alan Coldicott, Jonestown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 16/246,073

(22) Filed: Jan. 11, 2019

(65) Prior Publication Data
US 2020/0225339 A1 Jul. 16, 2020

(51) Int. Cl.
G01S 13/58 (2006.01)
G01S 13/08 (2006.01)
G01S 13/88 (2006.01)
G01S 13/86 (2006.01)

(52) U.S. Cl.
CPC .............. G01S 13/58 (2013.01); G01S 13/08 (2013.01); G01S 13/86 (2013.01); G01S 13/88 (2013.01)

(58) Field of Classification Search
CPC .......... G01S 13/58; G01S 13/92; G01S 13/08; G01S 13/86; G01S 5/2094
USPC .................................... 342/109, 107, 42, 47
See application file for complete search history.

(56) References Cited

U.S. PATENT DOCUMENTS

| 7,652,234 | B2* | 1/2010 | Shukrun | ............... F42B 12/365 244/3.15 |
|---|---|---|---|---|
| 9,747,795 | B1 | 8/2017 | Espinosa | |
| 10,399,674 | B2* | 9/2019 | Goodrich | ................ F41H 11/02 |
| 10,495,421 | B2* | 12/2019 | Abramov | ............. G05D 1/0016 |
| 2007/0210953 | A1* | 9/2007 | Abraham | ............. G08G 5/0069 342/29 |
| 2008/0017752 | A1* | 1/2008 | Shukrun | .................. F41H 11/02 244/3.16 |
| 2008/0169929 | A1 | 7/2008 | Albertson et al. | |
| 2010/0026554 | A1* | 2/2010 | Longman | ................ F41G 7/301 342/62 |
| 2012/0025964 | A1* | 2/2012 | Beggs | ...................... B60Q 1/26 340/435 |

(Continued)

Primary Examiner — Erin F Heard
Assistant Examiner — Michael W Justice
(74) Attorney, Agent, or Firm — Garg Law Firm, PLLC; Rakesh Garg; Jeffrey S LaBaw

(57) ABSTRACT

Using a distance sensor, a set of distances to a target object is measured, a distance in the set being measured at a time. From the set of distances and corresponding times, a trajectory of the target object is predicted. Based on receiving a signal identifying a friendly device, a correlation of the trajectory with a trajectory of the friendly device is determined. Responsive to the trajectory being predicted to intercept a defined volume around the distance sensor and responsive to the correlation being above a threshold degree of correlation, the target object is classified as a threat. Responsive to the trajectory being predicted to intercept a defined volume around the distance sensor and responsive to the correlation being below a threshold degree of correlation, a threat level corresponding to the target object is identified based on the trajectory of the target object and trajectory of the friendly device.

20 Claims, 6 Drawing Sheets

(56) References Cited

U.S. PATENT DOCUMENTS

| | | | |
|---|---|---|---|
| 2016/0023760 A1* | 1/2016 | Goodrich | G05D 1/12 |
| | | | 244/10 |
| 2016/0082885 A1* | 3/2016 | Rashid | G08G 1/166 |
| | | | 340/435 |
| 2016/0371980 A1* | 12/2016 | Ignaczak | G08B 25/08 |
| 2017/0120804 A1* | 5/2017 | Kentley | B60W 30/08 |
| 2017/0192089 A1* | 7/2017 | Parker | G01S 13/88 |
| 2017/0265051 A1 | 9/2017 | Vembar et al. | |
| 2017/0371339 A1 | 12/2017 | Charette et al. | |
| 2018/0335779 A1* | 11/2018 | Fisher | B64C 39/024 |
| 2019/0063881 A1* | 2/2019 | Abramov | G05D 1/104 |
| 2019/0068953 A1* | 2/2019 | Choi | G01B 11/25 |
| 2019/0088156 A1* | 3/2019 | Choi | F41G 7/2293 |
| 2020/0041234 A1* | 2/2020 | Abramov | B64C 39/024 |
| 2020/0102075 A1* | 4/2020 | Goodrich | B64C 39/024 |
| 2020/0108922 A1* | 4/2020 | Smith | G05D 1/101 |
| 2020/0108924 A1* | 4/2020 | Smith | F41H 13/0043 |
| 2020/0108925 A1* | 4/2020 | Smith | B64D 1/08 |

* cited by examiner

TRAJECTORY BASED THREAT ALERTING WITH FRIENDLY DEVICE AUGMENTATION

TECHNICAL FIELD

The present invention relates generally to a method, system, and computer program product for trajectory-based object threat detection. More particularly, the present invention relates to a method, system, and computer program product for trajectory-based object threat alerting with friendly device augmentation.

BACKGROUND

On patrol, law enforcement officers and those performing similar job functions must be alert for threats coming from any direction. For example, someone could seize an officer from behind, or throw a rock or another object at an officer. In addition, protective equipment such as helmets or body armor can limit a user's peripheral vision and freedom of movement, also limiting a user's ability to detect and avoid an incoming threat.

SUMMARY

The illustrative embodiments provide a method, system, and computer program product. An embodiment includes a method that measures, using a distance sensor, a set of distances to a target object, a distance in the set of distances being measured at a time. An embodiment predicts, from the set of distances and corresponding times, a trajectory of the target object. An embodiment determines, based on receiving a signal identifying a friendly device, a correlation of the trajectory with a trajectory of the friendly device. An embodiment classifies, responsive to the trajectory being predicted to intercept a defined volume around the distance sensor and responsive to the correlation being above a threshold degree of correlation, the target object as a threat. An embodiment identifies, responsive to the trajectory being predicted to intercept a defined volume around the distance sensor and responsive to the correlation being below a threshold degree of correlation, a threat level corresponding to the target object based on the trajectory of the target object and trajectory of the friendly device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
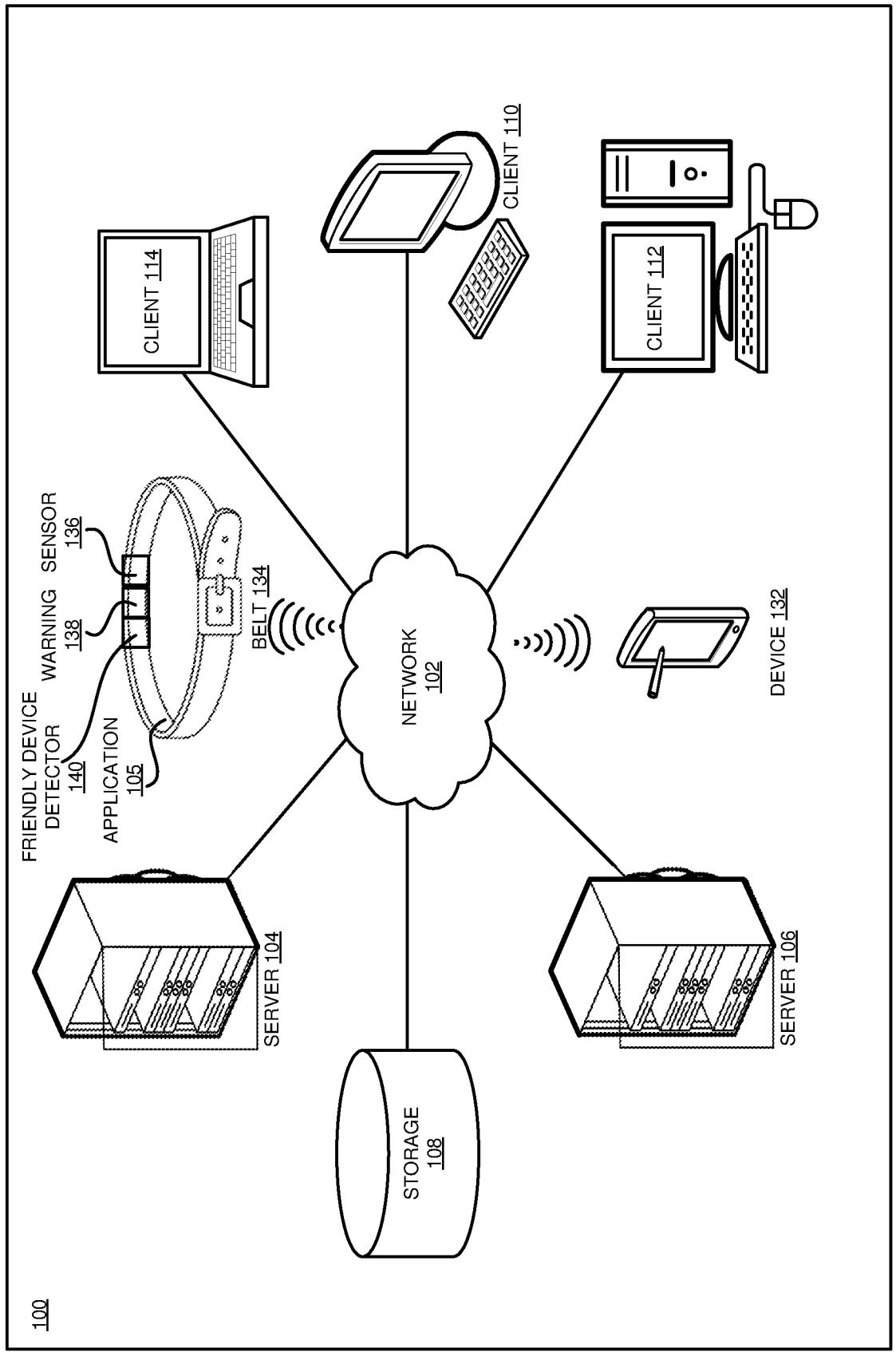
FIG. 1 depicts a block diagram of a network of data processing systems in which illustrative embodiments may be implemented.

The illustrative embodiments recognize that a moving object can approach a person from any direction, including behind or from the side of a person. When a moving object comes from locations outside the person's field of view, the object is more difficult to detect in time to take any necessary evasive action as compared to objects that approach the person in the person's field of view.

The illustrative embodiments also recognize that patrolling officers typically wear equipment such as a protective vest, weapon, baton, handcuffs, and other equipment. Thus, any additional equipment for officer wear should be relatively small and lightweight.

The illustrative embodiments further recognize that not all moving objects near a person are actually threats to that person. Instead, a person may have a nearby partner who can assist in responding to a perceived threat. In such a case, the partner can be regarded as a moving object, who could be moving towards the person from outside the person's field of view but still not be a threat to the person.

Consequently, the illustrative embodiments recognize that there is an unmet need for a wearable apparatus that can detect a moving object near or approaching a wearer, classify the moving object as a threatening or a non-threatening object, determine a threat level associated with the threatening moving object, and warn the user about the threatening object and the associated threat level in time for the person to take evasive action.

The illustrative embodiments recognize that the presently available tools or solutions do not address these needs or provide adequate solutions for these needs. The illustrative embodiments used to describe the invention generally address and solve the above-described problems and other problems related to trajectory-based object threat alerting with friendly device augmentation.

Hereinafter, a reference to a moving object includes inanimate objects, persons, animals, or some combination thereof, unless expressly differentiated where used. Hereinafter, a person associated with the wearable apparatus of an embodiment is interchangeably referred to as a person or a user unless expressly distinguished where used. Any reference to a "friendly", "friendly device/object/person" is a reference to an object that does not pose a threat of harm to the person or has a threat level below a threshold level of threat as described herein.

An embodiment can be implemented as a software application. The application implementing an embodiment can be configured as a modification of an existing environment monitoring system, as a separate application that operates in conjunction with an existing environment monitoring system, a standalone application, or some combination thereof.

Particularly, some illustrative embodiments provide a method by which a threat level corresponding to an object can be determined from a trajectory of the object and a correlation of the trajectory with a location of a friendly device or friendly object associated with a partner or other designated object that is not to be considered a threat.

An embodiment includes a distance sensor used to monitor the environment surrounding the sensor. An environment surrounding the sensor comprises a three-dimensional physical space extending up to a pre-defined distance from the sensor in one or more designated directions. The environment surrounding the sensor is interchangeably referred to as a space, a volume, a volume of space, and other similarly purposed terms, all intended to identify the environment surrounding one or more sensors.

A distance sensor senses the proximity of an object, or a distance to an object, without any physical contact with the object. In one embodiment, a distance sensor emits an electromagnetic or sound field, i.e., a beam of electromagnetic radiation or sound waves, respectively, or a series of pulses of one or more of these or other suitable types. The emitted signal or pulse reflects from an object that may be present, moving, or both, in the field. The reflection forms a return signal, which the embodiment receives. The embodiment detects changes in the field or return signal. A degree of change in the field or return signal—for example, a time taken for a signal to bounce off the object and return to the sensor—indicates a distance to the object. Some common types of distance sensors include radar, laser, microwave, magnetic, and sonar and ultrasonic.

In one embodiment, a distance sensor is a wearable device worn by the person. In another embodiment, the distance sensor is affixed to an item of clothing or equipment of the user, such as a belt, to monitor a three-dimensional volume of space around the user. For improved coverage of a volume around an embodiment, another embodiment includes multiple distance sensors. One embodiment uses multiple sensors worn on a user's body in some manner described herein, and disposed to monitor one or more volumes near the back and sides of the user. Another embodiment uses multiple sensors worn on a user's body disposed to monitor a cylindrical volume around the user. Another embodiment uses multiple sensors worn on a user's body disposed to monitor a volume around the user extending above the user's head. In an embodiment, a sensor is affixed to an item of clothing or equipment of the user (for example, a belt), and another sensor is affixed to a different item of clothing or equipment of the user (for example, a back of a helmet. In another embodiment, multiple sensors are affixed to the same item of clothing or equipment of the user, such as a belt, to monitor an area around the user. In another embodiment, a sensor is affixed to a vehicle to monitor an area around the vehicle. Other affixing possibilities for a sensor are also contemplated within the scope of the illustrative embodiments.

An embodiment including more than one sensor affixed to an apparatus uses a calibration procedure to determine a distance between one sensor and another sensor. In one calibration procedure, a measurement of distance between affixion points for each sensor is obtained and supplied to an application included in an embodiment. In another calibration procedure, an embodiment measures a distance from each sensor to an object at a known distance from the embodiment, then uses the set of measured distances to determine a distance between any two sensors. An embodiment performs a calibration procedure during a manufacturing process, an installation process, or subsequent to an embodiment's detection that an individual sensor has been added to the embodiment.

An embodiment uses a distance sensor to measure a set of distances to an object detected within a radius of a volume around the sensor. One embodiment is configurable to use a predetermined radius. Another embodiment uses a detection range of the sensor as the radius, thus measuring the set of distances to any object capable of detection by the sensor. One embodiment is configurable to measure the set of distances to an object only if the object is above a threshold size. Another embodiment is configurable to measure the set of distances to an object only if the object is between a lower size threshold and an upper size threshold.

Another embodiment measures the set of distances to any detected object, without regard for a size threshold, thus measuring the set of distances to any object capable of detection by the sensor. A time interval between an embodiment's distance measurements is set so as to provide sufficient detail for threat level analysis of the object while not using battery power unnecessarily by performing too many measurements that do not supply additional useful information. For example, if a time interval of one second between an embodiment's distance measurements provides sufficient detail for threat level analysis of the object, using a time interval of 0.5 seconds between an embodiment's distance measurements expends additional power obtaining unneeded measurements.

An embodiment also associates a timestamp with each distance measurement. A timestamp, as used herein, is a recorded time at which a distance measurement was determined. Using the set of distances and associated timestamps, an embodiment determines a past trajectory for an object. As used herein, a trajectory is a path through space followed by an object.

An embodiment projects the past trajectory forward in time to obtain a future trajectory. Based on the projection, an embodiment determines whether the future trajectory will intercept a volume of a predetermined size and shape around the embodiment, a time at which the object will intercept the volume, and a speed at which the object will intercept the volume. An object which is not projected to intercept the volume—for example, a stationary object or an object moving away from the embodiment—is considered a non-threat and does not necessitate a warning to a user of the embodiment. An object which is projected to intercept the volume is also referred to as a target object.

Some objects may identify themselves by emitting one or more signals from the object. An embodiment detects the source location of a signal identifying a device or object as a friendly object. A friendly object is worn by a partner of an embodiment's user to indicate that the partner should not be considered a threat to the user. An embodiment determines a correlation between a past and projected trajectory for a detected object and a past and projected trajectory for the source of the friendly object signal. If the two trajectories have above a threshold measure of correlation, an embodiment can conclude that the approaching object is friendly. For example, the approaching object may be a friendlydevice-wearing partner of the embodiment user, or a friendly-device-emitting car being driven by a partner of the embodiment user.

An embodiment evaluates a threat level for the object, based on the projected trajectory and speed of the object. Another embodiment further computes a degree of correlation, if any, between the moving object and a detected friendly object to classify the moving object. In one embodiment, if the projected trajectory is projected to intercept a defined volume around the embodiment and no friendly object is detected within a defined distance of the embodiment, the embodiment sets a threat level to a "high" setting. As well, if the embodiment is unable to determine whether the projected trajectory will intercept the volume with a degree of confidence above a threshold degree of confidence, the embodiment also sets the threat level as if the target object would intercept the volume. A false positive—warning a user when no threat exists—is preferred over not warning the user when a threat does exist. The defined volume is not necessarily a sphere, but may extend further from one portion of a user's body than from another portion of a user's body. For example, because a head injury is often more serious than a leg injury, users are often more interested in avoiding a head injury than a leg injury. Thus, a volume intended to prioritize avoiding a head injury could be defined with a larger radius around a user's head than around the user's legs.

If the projected trajectory is projected to intercept a defined volume surrounding the embodiment and the projected trajectory is not correlated with that of a friendly object, an embodiment sets a threat level based on the projected trajectory and the relative locations of the target object and the friendly object. If the target object will intercept the volume before the friendly object does, an embodiment determines the threat level as if the friendly object were not present. For example, if the target object is coming from a location at one side of the user and the friendly object is at a location the other side of the user, it is unlikely that the wearer of the friendly object will be able to ameliorate the threat before the target object arrives near the user. On the other hand, if the target object and the friendly object are moving towards each other and will meet before the target object arrives at the user, the threat level should be set to a lower level than would be the case if the friendly object were not present, but a higher level than would be the case if the target object were not projected to intercept the user's volume at all. In this case, it is likely that the wearer of the friendly object will be able to ameliorate the threat before the target object arrives near the user. For example, the threat level might be set to "medium" instead of "high" (in an embodiment using "high", "medium", and "low" threat level settings). However, if the embodiment is unable to determine an effect of the friendly object wearer on the target object with a degree of confidence above a threshold degree of confidence, the embodiment sets the threat level as if the friendly object were not present.

Additional methods of classifying a moving object as a threat of a certain degree are contemplated within the scope of the illustrative embodiments. For example, an object showing greater than a threshold acceleration in its trajectory may be a higher threat than an object that is not accelerating or is decelerating along its trajectory. As another example, an object showing an erratic behavior—e.g., more than one change in acceleration in its trajectory over a period may pose a higher degree of threat as compared to another object exhibiting a steady rate of acceleration or deceleration. From this disclosure, those of ordinary skill in the art will be able to adapt an embodiment to assess threat levels of an object using other methods, and such adaptations are contemplated within the scope of the illustrative embodiments.

Once an embodiment has determined a threat level, the embodiment notifies a user of the threat level. One embodiment uses a light to notify the user. Another embodiment uses a sound to notify the user. Another embodiment uses a vibration to notify the user without alerting another to the threat detection. Another embodiment uses a different light code corresponding to each defined threat level. For example, an embodiment could use a yellow light to indicate a "medium" threat level and a red light to indicate a "high" threat level. Another embodiment uses a different sound code corresponding to each defined threat level. Another embodiment uses a different vibration code corresponding to each defined threat level. Other threat level indications, using other combinations of light, sound, vibration, and other alert mechanism, are also possible and contemplated within the scope of the illustrative embodiments.

If appropriate, based on the relative trajectories and locations of the target object and the friendly object, an embodiment warns the friendly object of the threat of the target object. For example, if the trajectories of the target object and the friendly object will meet within a predetermined time period, the user wearing the friendly object should be warned in time to avoid the target object.

Another embodiment further refines the threat level according to the projected speed of the object. If the object is projected to intercept the volume at a speed above a threshold speed, the embodiment sets a threat level to a "high" setting. If the object is projected to intercept the volume at a speed below a threshold speed, the embodiment sets a threat level to a "low" setting. Because the kinetic energy of an object is proportional to the square of the object's velocity, a fast-moving object will hit harder than a comparatively slower-moving object of the same mass, a faster moving object is considered to be more of a threat than a slower moving object. Another embodiment uses two speed thresholds. If an incoming object's speed is above the higher speed threshold, the embodiment sets a threat level to a "high" setting. If an incoming object's speed is between the higher speed threshold and the lower speed threshold, the embodiment sets a threat level to a "medium" setting. If an incoming object's speed is below the lower speed threshold, the embodiment sets a threat level to a "low" setting. More speed thresholds, corresponding to more possible threat level settings, are also possible and contemplated within the scope of the illustrative embodiments.

Another embodiment further refines the threat level according to the projected time of arrival of the object. If the object is projected to intercept the volume at a time within a threshold time period, the embodiment sets a threat level to a "high" setting. If the object is projected to intercept the volume at a time outside a threshold time period, the embodiment sets a threat level to a "low" setting. An object arriving within a short time period gives a user less time to react, necessitating a higher threat level, while an object arriving within a comparatively longer time period gives a user correspondingly more time to react, allowing for a correspondingly lower threat level. More time thresholds, corresponding to more possible threat level settings, are also possible and contemplated within the scope of the illustrative embodiments.

Another embodiment further refines the threat level according to a detected size of the target object. One embodiment sets a threat level according to a detected size of the target object. If an object's size is above a size threshold, the embodiment sets a threat level to a "high" setting. If an object's size is below a size threshold, the embodiment sets a threat level to a "low" setting. An comparatively larger object is likely to do more damage than a smaller object, necessitating a higher threat level for the larger object. More size thresholds, corresponding to more possible threat level settings, are also possible and contemplated within the scope of the illustrative embodiments.

Another embodiment further refines the threat level according to a number of target objects. One embodiment increases the threat level if more than one target object is determined to be a threat during the same time period. For example, if the threat level was determined to be "low" based on one target object, but there are two target objects, the threat level is raised to "high". Another embodiment increases the threat level based on the number of target objects determined to be a threat during the same time period. For example, this embodiment might raise the threat level to "medium" for two target objects, and raise the threat level to "high" for three or more target objects. Other schemes of raising the threat level based on the number of objects are also possible and contemplated within the scope of the illustrative embodiments.

The example levels of "high", "medium", and "low" are only used for the clarity of the description and are not intended to be limiting on the embodiments. Generally, any threat level scale can be used to classify a level of the threat posed by an object without departing the scope of the illustrative embodiments.

The manner of trajectory-based object threat alerting with friendly device augmentation described herein is unavailable in the presently available methods in the technological field of endeavor pertaining to threat detection and avoidance. A method of an embodiment described herein, when implemented to execute on a device or data processing system, comprises substantial advancement of the functionality of that device or data processing system in using a trajectory of the object and a correlation of the trajectory with a location of a friendly object to determine a threat level corresponding to the detected object.

The illustrative embodiments are described with respect to certain types of objects, threat levels, trajectories, projections, thresholds, calibrations, sensors, affixion points, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
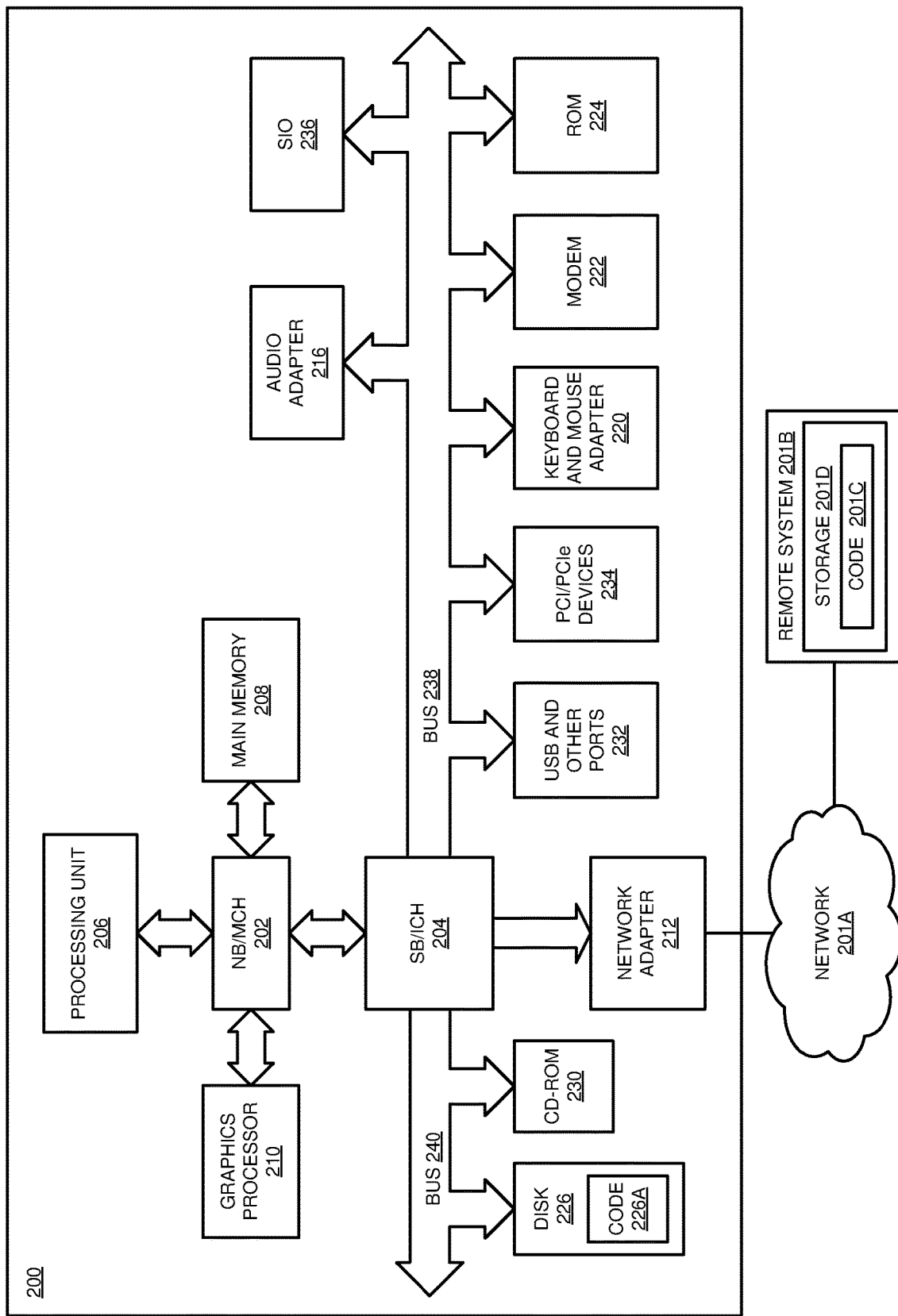
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Belt 134 is an example of a device described herein that implements an embodiment. For example, belt 134 can take the form of a wearable computing device, or any other suitable device. Any software application described as executing in another data processing system in FIG. 1 can be configured to execute in belt 134 in a similar manner. Any data or information stored or produced in another data processing system in FIG. 1 can be configured to be stored or produced in belt 134 in a similar manner.

Belt 134 can be any wearable item of clothing or equipment intended to be worn or carried by a user. Belt 134 includes sensor 136, warning module 138, friendly device detector 140, and application 105. Application 105 implements an embodiment described herein. Using sensor 136, warning module 138, and friendly device detector 140, application 105 detects objects and friendly devices and warns a user as appropriate.

Servers 104 and 106, clients 110, 112, and 114, belt 134, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG.

2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
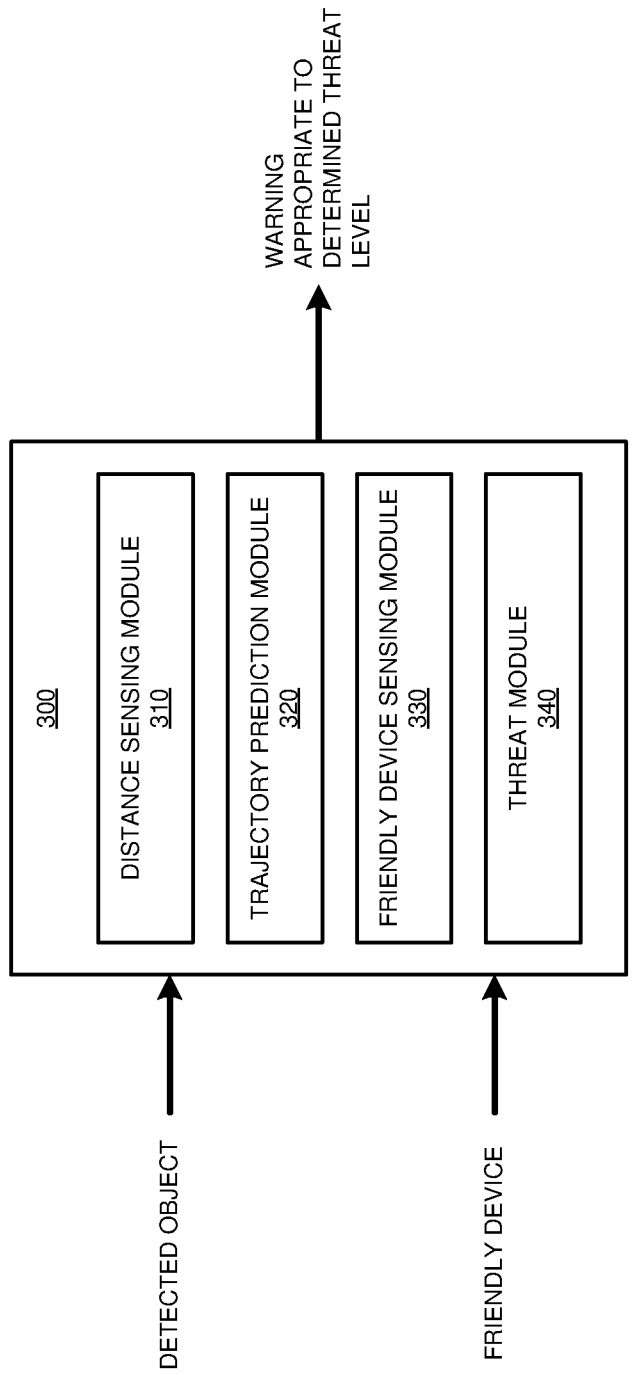
FIG. 3 depicts a block diagram of an example configuration for trajectory-based object threat alerting with friendly device augmentation in accordance with an illustrative embodiment.

With reference to FIG. 3, this figure depicts a block diagram of an example configuration for trajectory-based object threat alerting with friendly device augmentation in accordance with an illustrative embodiment. Application 300 is an example of application 105 in FIG. 1 and executes in belt 134 in FIG. 1.

Distance sensing module 310 uses sensor 136 to monitor the environment surrounding the sensor and measure a set of distances to an object detected within a predetermined radius of a volume around the sensor. Module 310 is configured to measure the set of distances to an object only if the object is above a threshold size. A time interval between module 310's distance measurements is set so as to provide sufficient detail for threat level analysis of the object while not using battery power unnecessarily by performing too many measurements that do not supply additional useful information. Module 310 also associates a timestamp with each distance measurement.

If multiple sensors 134 are available for use, module 310 uses a calibration procedure to determine a distance between one sensor and another sensor. In particular, module 310 measures a distance from each sensor to an object at a known distance from the embodiment, then uses the set of measured distances to determine a distance between any two sensors.

Using the set of distances and associated timestamps, trajectory prediction module 320 determines a past trajectory for an object and projects the past trajectory forward in time to obtain a future trajectory. Friendly device sensing module 330 detects the source location of a signal identifying a device as a friendly device.

Based on the projection, threat module 340 determines whether the future trajectory will intercept a volume of a predetermined size and shape around the embodiment, a time at which the object will intercept the volume, and a speed at which the object will intercept the volume. An object which is not projected to intercept the volume—for example, a stationary object or an object moving away from the embodiment—is considered a non-threat and does not necessitate a warning to a user of the embodiment. An object which is projected to intercept the volume is evaluated as a threat.

Threat module 340 also determines a correlation between a past and projected trajectory for a detected object and a past and projected trajectory for the source of the friendly device signal. If the two trajectories have above a threshold measure of correlation, threat module 340 can conclude that the approaching object is friendly.

Thus, threat module 340 evaluates a threat level for the object, based on the projected trajectory and speed of the object and a degree of correlation, if any, with a detected friendly device. If the projected trajectory is projected to intercept a defined volume around the embodiment and no friendly device is detected within a defined distance of sensor 134, threat module 340 sets a threat level to a "high" setting. As well, if threat module 340 is unable to determine whether the projected trajectory will intercept the volume with a degree of confidence above a threshold degree of confidence, threat module 340 also sets the threat level as if the target object would intercept the volume. If the projected trajectory is projected to intercept a defined volume around the embodiment and the projected trajectory is not correlated with that of a friendly device, threat module 340 sets a threat level based on the projected trajectory and the relative locations of the target object and the friendly device. If the target object will intercept the volume before the friendly device does, threat module 340 determines the threat level as if the friendly device were not present. If threat module 340 is unable to determine an effect of the friendly device wearer on the target object with a degree of confidence above a threshold degree of confidence, threat module 340 sets the threat level as if the friendly device were not present. Once threat module 340 has determined a threat level, application 300 notifies a user of the threat level and, if appropriate, warns the friendly device of the threat of the target object.

Figure 4:
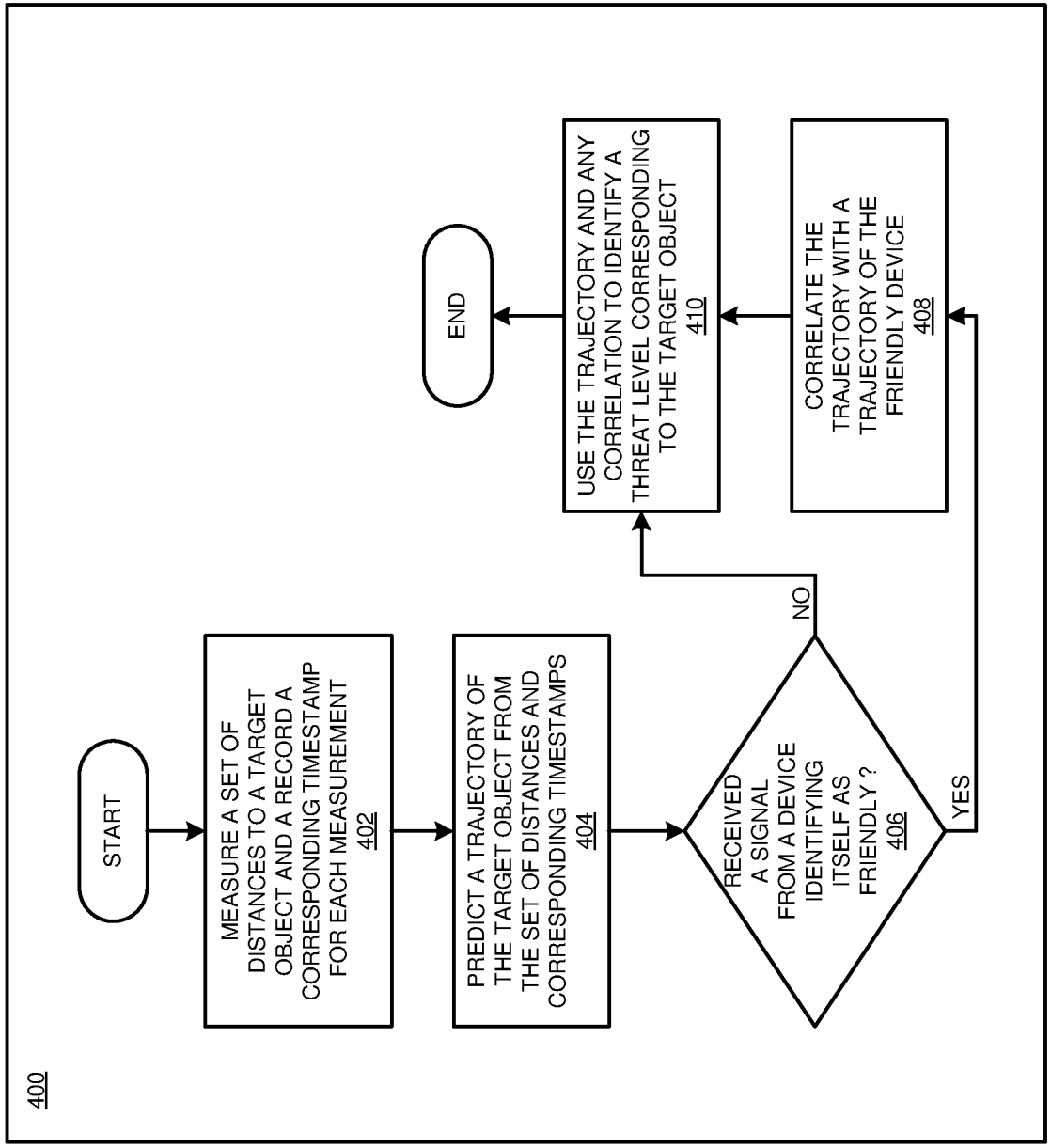
FIG. 4 depicts a flowchart of an example process for trajectory-based object threat alerting with friendly device augmentation in accordance with an illustrative embodiment.

With reference to FIG. 4, this figure depicts a flowchart of an example process for trajectory-based object threat alerting with friendly device augmentation in accordance with an illustrative embodiment. Process 400 can be implemented in application 300 in FIG. 3.

In block 402, the application measures a set of distances to a target object and records a corresponding timestamp for each measurement. In block 404, the application predicts a trajectory of the target object from the set of distances and corresponding timestamps. In block 406, the application checks whether it is receiving a signal from a device identifying itself as a friendly device. If yes ("YES" path of block 406), in block 408 the application correlates the predicted trajectory with a trajectory of the friendly device. In either case, in block 410 the application uses the trajectory and any correlation with the friendly device to identify a threat level corresponding to the target object. Then the application ends.

Figure 5:
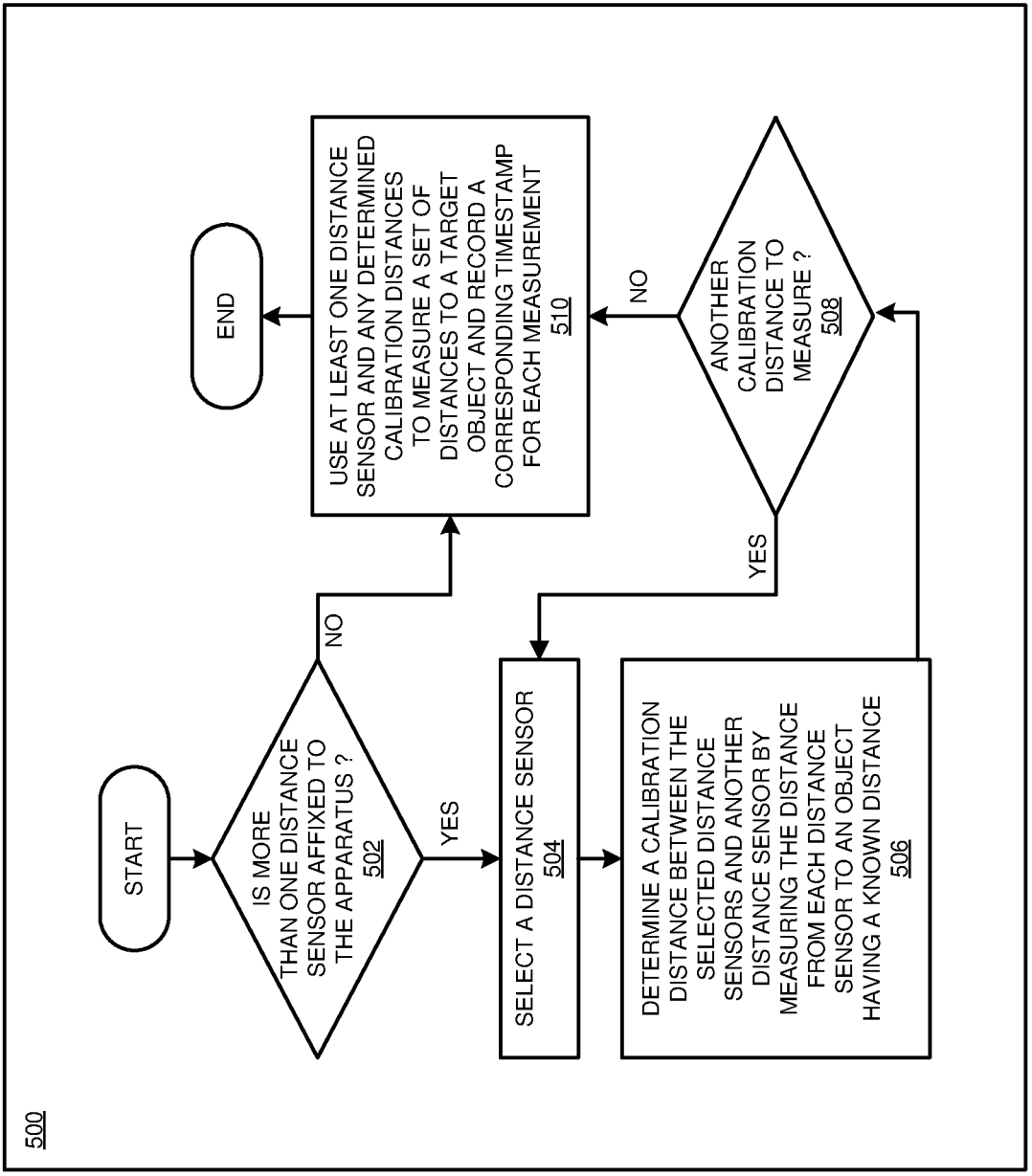
FIG. 5 depicts another flowchart of an example process for trajectory-based object threat alerting with friendly device augmentation in accordance with an illustrative embodiment.

With reference to FIG. 5, this figure depicts another flowchart of an example process for trajectory-based object threat alerting with friendly device augmentation in accordance with an illustrative embodiment. Process 500 can be implemented in application 300 in FIG. 3 and depicts more detail of block 402 in FIG. 4.

In block 502, the application checks whether more than one distance sensor is affixed to the apparatus in which the application is executing. If no ("NO" path of block 502), the application proceeds to block 510. If yes ("YES" path of block 502), in block 504 the application selects a distance sensor. In block 506, the application determines a calibration distance between the selected distance sensor and another distance sensor by measuring the distance from each distance sensor to an object at a known distance. In block 508, the application checks whether there is another calibration distance to measure. If yes ("YES" path of block 508), the application returns to block 504. If no ("NO" path of block 508), in block 510 the application uses at least one distance sensor and any determined calibration distances to measure a set of distances to a target object and record a corresponding timestamp for each measurement.

Figure 6:
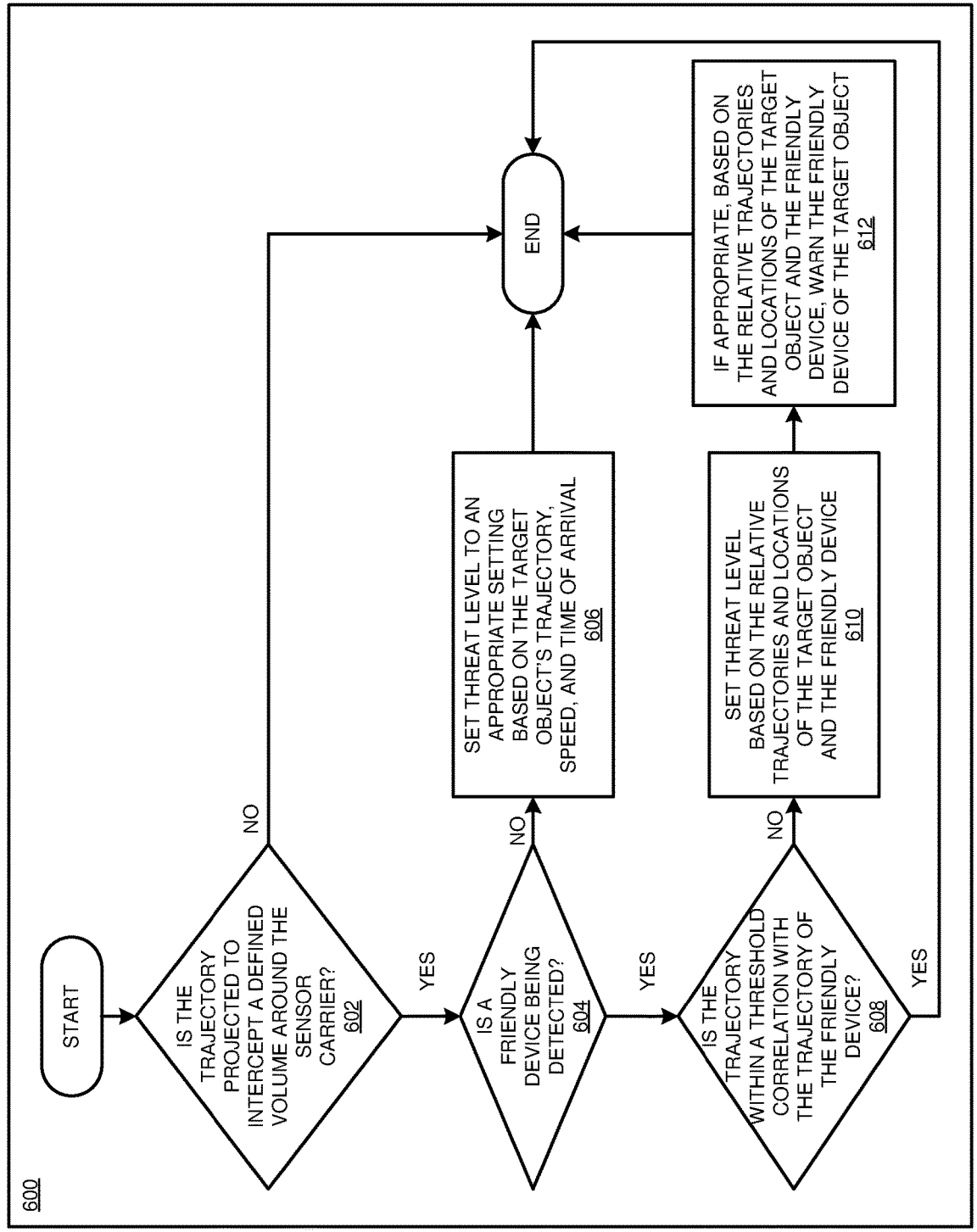
FIG. 6 depicts another flowchart of an example process for trajectory-based object threat alerting with friendly device augmentation in accordance with an illustrative embodiment.

With reference to FIG. 6, this figure depicts another flowchart of an example process for trajectory-based object threat alerting with friendly device augmentation in accordance with an illustrative embodiment. Process 600 can be implemented in application 300 in FIG. 3 and depicts more detail of block 410 in FIG. 4.

In block 602, the application determines whether the trajectory is projected to intercept a defined volume around an apparatus including distance sensor. If not ("NO" path of block 602), the application ends. Otherwise ("YES" path of block 602), in block 604 the application determines whether a friendly device is being detected. If not ("NO" path of block 604), in block 606 the application sets a threat level to an appropriate setting based on the target object's trajectory, speed, and time of arrival; then the application ends. Otherwise ("YES" path of block 604), in block 608 the application determines whether the trajectory is within a threshold correlation with the trajectory of the friendly device. If yes ("YES" path of block 608), the application ends. Otherwise ("NO" path of block 608), in block 610 the application sets a threat level to an appropriate setting based on the relative trajectories and locations of the target device and the friendly device. In block 612, if appropriate based on the relative trajectories and locations of the target device and the friendly device, the application warns the friendly device of the threat of the target object. Then the application ends.

Thus, a computer implemented method, system or apparatus, and computer program product are provided in the illustrative embodiments for trajectory-based object threat alerting with friendly device augmentation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
  measuring, using a distance sensor, a set of distances to a target object, a distance in the set of distances being measured at a time;
  predicting, from the set of distances and corresponding times, a trajectory of the target object;
  classifying, responsive to the trajectory of the target object being predicted to intercept a defined volume around the distance sensor, the target object as a threat; and
  adjusting, responsive to predicting that a trajectory of a friendly device will meet the trajectory of the target object before the target object intercepts the defined volume around the distance sensor, a threat level of the target object downward, the trajectory of the friendly device predicted responsive to receiving a signal identifying the friendly device.

2. The method of claim 1, further comprising:
  maintaining, in an absence of receiving a signal identifying the friendly device, an initial threat level of the target object, the initial threat level determined during classification of the target object as a threat.

3. The method of claim 2, wherein the initial threat level determined during classification of the target object is a high threat level and the adjusting reduces the threat level of the target object to a medium threat level.

4. The method of claim 1, further comprising:
  classifying, responsive to the trajectory of the target object being predicted to be outside the defined volume around the distance sensor, a second target object as a non-threat.

5. The method of claim 1, further comprising:
determining, by measuring, using the distance sensor and a second distance sensor, a distance to an object having a known distance, the distance sensor and the second distance sensor each affixed to a different position on the same object, a calibration distance between the distance sensor and a second distance sensor;
measuring, using the second distance sensor, a second set of distances to the target object; and
predicting, from the set of distances, the second set of distances, and the calibration distance, the trajectory of the target object.

6. The method of claim 1, wherein the distance sensor is mounted on a wearable device.

7. The method of claim 1, further comprising:
refining, according to a projected speed of the target object, the threat level.

8. The method of claim 1, further comprising:
refining, according to a projected time of arrival of the target object, the threat level.

9. The method of claim 1, further comprising:
refining, according to a detected size of the target object, the threat level.

10. The method of claim 1, further comprising:
refining, responsive to identifying a second threat level corresponding to a second target object, the threat level.

11. The method of claim 1, further comprising:
sending, to the friendly device responsive to predicting that the trajectory of the friendly device will meet the trajectory of the target object before the target object intercepts the defined volume around the distance sensor, a warning corresponding to the target object based on the trajectory of the target object and trajectory of the friendly device.

12. A computer usable program product comprising one or more computer-readable storage devices, and program instructions stored on at least one of the one or more storage devices, the stored program instructions comprising:
program instructions to measure, using a distance sensor, a set of distances to a target object, a distance in the set of distances being measured at a time;
program instructions to predict, from the set of distances and corresponding times, a trajectory of the target object;
program instructions to classify, responsive to the trajectory of the target object being predicted to intercept a defined volume around the distance sensor, the target object as a threat; and
program instructions to adjust, responsive to predicting that a trajectory of a friendly device will meet the trajectory of the target object before the target object intercepts the defined volume around the distance sensor, a threat level of the target object downward, the trajectory of the friendly device predicted responsive to receiving a signal identifying the friendly device.

13. The computer usable program product of claim 12, further comprising:
program instructions to maintain, in an absence of receiving a signal identifying the friendly device, an initial threat level of the target object, the initial threat level determined during classification of the target object as a threat.

14. The computer usable program product of claim 12, further comprising:
program instructions to determine, by measuring, using the distance sensor and a second distance sensor, a distance to an object having a known distance, the distance sensor and the second distance sensor each affixed to a different position on the same object, a calibration distance between the distance sensor and a second distance sensor;
program instructions to measure, using the second distance sensor, a second set of distances to the target object; and
program instructions to predict, from the set of distances, the second set of distances, and the calibration distance, the trajectory of the target object.

15. The computer usable program product of claim 12, wherein the distance sensor is mounted on a wearable device.

16. The computer usable program product of claim 12, further comprising:
program instructions to refine, according to a projected speed of the target object, the threat level.

17. The computer usable program product of claim 12, further comprising:
program instructions to refine, according to a projected time of arrival of the target object, the threat level.

18. The computer usable program product of claim 12, wherein the computer usable code is stored in a computer readable storage device in a data processing system, and wherein the computer usable code is transferred over a network from a remote data processing system.

19. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to measure, using a distance sensor, a set of distances to a target object, a distance in the set of distances being measured at a time;
program instructions to predict, from the set of distances and corresponding times, a trajectory of the target object;
program instructions to classify, responsive to the trajectory of the target object being predicted to intercept a defined volume around the distance sensor, the target object as a threat; and
program instructions to adjust, responsive to predicting that a trajectory of a friendly device will meet the trajectory of the target object before the target object intercepts the defined volume around the distance sensor, a threat level of the target object downward, the trajectory of the friendly device predicted responsive to receiving a signal identifying the friendly device.

\* \* \* \* \*